United States Patent
Wong et al.

(10) Patent No.: US 10,200,756 B2
(45) Date of Patent: Feb. 5, 2019

(54) SYNCHRONIZATION OF FAVORITES AND/OR RECENTLY VIEWED LISTS BETWEEN REGISTERED CONTENT PLAYBACK DEVICES

(75) Inventors: Ling Jun Wong, Escondido, CA (US); Charles McCoy, Coronado, CA (US); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 900 days.

(21) Appl. No.: 13/076,846

(22) Filed: Mar. 31, 2011

(65) Prior Publication Data

US 2012/0210225 A1 Aug. 16, 2012

Related U.S. Application Data

(60) Provisional application No. 61/442,039, filed on Feb. 11, 2011.

(51) Int. Cl.
G06F 3/0481 (2013.01)
H04N 21/45 (2011.01)
(Continued)

(52) U.S. Cl.
CPC ....... H04N 21/4532 (2013.01); G06F 3/0484 (2013.01); G06F 3/0487 (2013.01);
(Continued)

(58) Field of Classification Search
CPC .. G06F 3/1454; G06F 3/04812; G06F 3/0484; G06F 3/0487; H04N 21/25;
(Continued)

(56) References Cited

U.S. PATENT DOCUMENTS 5,444,837 A 8/1995 Bomans et al.
5,635,989 A 6/1997 Rothmuller
(Continued)

FOREIGN PATENT DOCUMENTS

CA 2715681 A1 * 11/1999 ............... H04N 5/76
CN 1504928 6/2004
(Continued)

OTHER PUBLICATIONS

"Prospecting Differences", http://www3.nsbar.org/technology/documents/Prospecting%20Module%20update%200105pdf Downloaded Oct. 2010.
(Continued)

Primary Examiner — Steven P Sax
(74) Attorney, Agent, or Firm — Mayer & Williams PC

(57) ABSTRACT

Systems and methods for creating and employing software to handle the playback of media, especially video, in browsers that, in addition to or instead of playing the media in the browser, may use second display protocols to instruct a separate display device to play the media. The software can of any type that can transmit the content or specify a network location of the content item for subsequent playback to a content playback device. In one implementation, the software may be in the form of a web browser or other application that is configured to use for the playback of selected media types. The browser maintains a list of favorite and/or recently viewed services and content items and is configured to filter the list to include only those content items, or services with such content items, available for play back on the separate content playback device. In this way, favorite content items and services and/or recently viewed content items and services are made accessible using the second display on any content playback device registered with the user.

10 Claims, 7 Drawing Sheets

(51) Int. Cl.
*G06F 3/0487* (2013.01)
*G06F 3/0484* (2013.01)
*H04N 21/258* (2011.01)
*H04N 21/414* (2011.01)
*H04N 21/61* (2011.01)

(52) U.S. Cl.
CPC ... *G06F 3/04812* (2013.01); *H04N 21/25891* (2013.01); *H04N 21/41407* (2013.01); *H04N 21/6125* (2013.01)

(58) Field of Classification Search
CPC ............... H04N 21/46; H04N 21/4532; H04N 21/25891; H04N 21/41407; H04N 21/6125
USPC ....... 715/719, 748, 749, 751–754, 778, 704, 715/721–726, 756, 744–747; 345/2.3
See application file for complete search history.

(56) References Cited

U.S. PATENT DOCUMENTS

| | | | |
|---|---|---|---|
| 5,790,935 A | 8/1998 | Payton | |
| 6,411,996 B1 | 6/2002 | Albers | |
| 6,438,580 B1 | 8/2002 | Mears et al. | |
| 6,601,173 B1 | 7/2003 | Mohler | |
| 7,136,571 B1 | 11/2006 | Dagtas | |
| 7,389,523 B2 | 6/2008 | Kikinis | |
| 7,480,694 B2 | 1/2009 | Blennerhassett et al. | |
| 7,672,280 B2* | 3/2010 | Shim | H04L 12/189 370/312 |
| 7,853,715 B1 | 12/2010 | Katukam et al. | |
| 7,962,948 B1 | 6/2011 | Girouard et al. | |
| 7,970,922 B2* | 6/2011 | Svendsen | 709/231 |
| 8,001,143 B1 | 8/2011 | Gupta | |
| 8,028,314 B1 | 9/2011 | Sezan et al. | |
| 8,234,672 B2* | 7/2012 | Morse et al. | 725/49 |
| 8,255,791 B2 | 8/2012 | Koren | |
| 8,527,877 B2 | 9/2013 | Wohlert | |
| 8,527,883 B2 | 9/2013 | Sullivan | |
| 8,566,873 B2* | 10/2013 | Sie et al. | 725/41 |
| 8,631,437 B2 | 1/2014 | Schwesinger et al. | |
| 8,677,463 B2 | 3/2014 | Piepenbrink | |
| 8,769,140 B2 | 7/2014 | Chen | |
| 8,886,685 B2 | 11/2014 | Mercer | |
| 9,189,818 B2 | 11/2015 | Mcclements, IV | |
| 2001/0021305 A1 | 9/2001 | Sugiyama et al. | |
| 2002/0152461 A1 | 10/2002 | Istvan | |
| 2003/0056216 A1 | 3/2003 | Wugofski et al. | |
| 2003/0206554 A1 | 11/2003 | Dillon | |
| 2004/0002947 A1 | 1/2004 | De La Fuente et al. | |
| 2004/0052505 A1 | 3/2004 | Ahmad et al. | |
| 2004/0107169 A1 | 6/2004 | Lowe | |
| 2004/0205569 A1 | 10/2004 | McCarthy et al. | |
| 2004/0236633 A1* | 11/2004 | Knauerhase | G06Q 10/0631 705/26.8 |
| 2005/0026559 A1* | 2/2005 | Khedouri | H04H 20/63 455/3.06 |
| 2005/0041679 A1* | 2/2005 | Weinstein et al. | 370/432 |
| 2005/0057538 A1* | 3/2005 | Morse et al. | 345/204 |
| 2005/0149878 A1 | 7/2005 | White et al. | |
| 2005/0210101 A1* | 9/2005 | Janik | 709/203 |
| 2005/0246739 A1* | 11/2005 | Davidson | G06Q 20/3674 725/45 |
| 2006/0025073 A1 | 2/2006 | Benco et al. | |
| 2006/0159109 A1 | 7/2006 | Lamkin et al. | |
| 2006/0165040 A1* | 7/2006 | Rathod | G06Q 10/10 370/335 |
| 2006/0173974 A1 | 8/2006 | Tang | |
| 2006/0253596 A1* | 11/2006 | Barone | H04L 67/306 709/229 |
| 2006/0259867 A1 | 11/2006 | Watson et al. | |
| 2006/0265408 A1 | 11/2006 | Pini | |
| 2007/0011616 A1 | 1/2007 | Ording et al. | |
| 2007/0048716 A1 | 3/2007 | Hsu et al. | |
| 2007/0136778 A1* | 6/2007 | Birger et al. | 725/117 |
| 2007/0204308 A1 | 8/2007 | Nicholas et al. | |
| 2008/0040758 A1 | 2/2008 | Beetcher | |
| 2008/0126936 A1 | 5/2008 | Williams | |
| 2008/0155613 A1 | 6/2008 | Benya et al. | |
| 2008/0168502 A1 | 7/2008 | Trauth | |
| 2008/0181580 A1* | 7/2008 | Sakai et al. | 386/124 |
| 2008/0228429 A1* | 9/2008 | Huang | G06F 1/1626 702/141 |
| 2008/0250053 A1* | 10/2008 | Aaltonen | G06Q 30/08 |
| 2008/0288536 A1 | 11/2008 | Pfeiffer et al. | |
| 2008/0295012 A1 | 11/2008 | Sloo et al. | |
| 2008/0301732 A1 | 12/2008 | Archer et al. | |
| 2009/0012965 A1* | 1/2009 | Franken | G06Q 10/10 |
| 2009/0024943 A1* | 1/2009 | Adler | G04G 13/021 715/764 |
| 2009/0037294 A1* | 2/2009 | Malhotra | G06Q 30/06 705/26.1 |
| 2009/0158340 A1 | 6/2009 | Patel et al. | |
| 2009/0165051 A1 | 6/2009 | Armaly | |
| 2009/0182589 A1 | 7/2009 | Kendall | |
| 2009/0247096 A1 | 10/2009 | Walley et al. | |
| 2009/0249418 A1 | 10/2009 | Alastruey Gracia et al. | |
| 2009/0271283 A1 | 10/2009 | Fosnacht et al. | |
| 2009/0271289 A1 | 10/2009 | Klinger et al. | |
| 2009/0282447 A1* | 11/2009 | Mehta | H04L 65/4076 725/109 |
| 2009/0300203 A1* | 12/2009 | Virdi et al. | 709/231 |
| 2009/0300204 A1* | 12/2009 | Zhang et al. | 709/231 |
| 2009/0313299 A1* | 12/2009 | Bonev | G06Q 10/109 |
| 2010/0042642 A1* | 2/2010 | Shahraray et al. | 707/102 |
| 2010/0071076 A1 | 3/2010 | Gangotri | |
| 2010/0076946 A1 | 3/2010 | Barker et al. | |
| 2010/0077309 A1 | 3/2010 | Miyada | |
| 2010/0131527 A1 | 5/2010 | Wohlert | |
| 2010/0131978 A1 | 5/2010 | Friedlander et al. | |
| 2010/0169778 A1 | 7/2010 | Mundy et al. | |
| 2010/0169910 A1* | 7/2010 | Collins | G06Q 30/0251 725/14 |
| 2010/0235788 A1 | 9/2010 | Zappa et al. | |
| 2010/0265887 A1* | 10/2010 | Keum | H04L 12/2812 370/328 |
| 2010/0287609 A1* | 11/2010 | Gonzalez | G06F 21/10 726/14 |
| 2010/0293698 A1 | 11/2010 | Collart et al. | |
| 2010/0311468 A1* | 12/2010 | Shi | H04W 4/003 455/558 |
| 2011/0004519 A1 | 1/2011 | Aleong et al. | |
| 2011/0015985 A1 | 1/2011 | Curtis | |
| 2011/0047565 A1 | 2/2011 | Nakase | |
| 2011/0154404 A1 | 6/2011 | Piepenbrink | |
| 2011/0176787 A1 | 7/2011 | DeCamp | |
| 2011/0202945 A1 | 8/2011 | Pickelsimer | |
| 2011/0225617 A1 | 9/2011 | Rakib | |
| 2011/0276585 A1* | 11/2011 | Wagner | H04N 21/2225 707/769 |
| 2011/0283320 A1* | 11/2011 | Levin | H04N 21/466 725/40 |
| 2011/0302596 A1 | 12/2011 | Lundgren | |
| 2011/0321093 A1* | 12/2011 | McRae | 725/40 |
| 2011/0321100 A1* | 12/2011 | Tofighbakhsh | 725/58 |
| 2012/0008786 A1 | 1/2012 | Cronk | |
| 2012/0011588 A1 | 1/2012 | Milener et al. | |
| 2012/0054616 A1 | 3/2012 | Mittal | |
| 2012/0066186 A1 | 3/2012 | Wohlert | |
| 2012/0151015 A1 | 3/2012 | Plastina et al. | |
| 2012/0089911 A1* | 4/2012 | Hosking | G06F 17/30743 715/716 |
| 2012/0092438 A1 | 4/2012 | Suarez et al. | |
| 2012/0117587 A1 | 5/2012 | Pedlow et al. | |
| 2012/0117590 A1* | 5/2012 | Agnihotri | H04N 21/25816 725/30 |
| 2012/0139938 A1 | 6/2012 | Khedouri et al. | |
| 2012/0150683 A1 | 6/2012 | Herrington | |
| 2012/0194635 A1 | 8/2012 | Kubicka | |
| 2012/0210220 A1 | 8/2012 | Pendergast et al. | |
| 2012/0210238 A1 | 8/2012 | McCoy et al. | |

(56) References Cited

U.S. PATENT DOCUMENTS

| | | |
|---|---|---|
| 2012/0210241 A1 | 8/2012 | Wong |
| 2012/0210245 A1 | 8/2012 | McCoy et al. |
| 2012/0210378 A1 | 8/2012 | McCoy |
| 2012/0223959 A1 | 9/2012 | Lengeling |
| 2012/0254755 A1 | 10/2012 | Wohlert |
| 2012/0296934 A1 | 11/2012 | Carpenter et al. |
| 2012/0313751 A1* | 12/2012 | Kaelbling ............ B60N 2/0244 340/5.61 |
| 2013/0024206 A1 | 1/2013 | Hughes et al. |
| 2013/0024539 A9* | 1/2013 | Khedouri et al. ............ 709/217 |
| 2013/0111347 A1 | 5/2013 | Reilly et al. |
| 2013/0115974 A1 | 5/2013 | Lee et al. |
| 2013/0174035 A1 | 7/2013 | Grab |
| 2013/0179931 A1* | 7/2013 | Osorio et al. ................ 725/110 |

FOREIGN PATENT DOCUMENTS

| | | |
|---|---|---|
| CN | 1989768 | 6/2007 |
| CN | 101438580 | 5/2009 |
| WO | 2009129584 | 10/2009 |
| WO | 2010117610 A1 | 10/2010 |

OTHER PUBLICATIONS

Vijamaa, Unified Media Functions for Mobile Multimedia Devices, ACM 2008, pp. 1-8.

Lee et al., Personalized Contents Guide and Browsing based on User Preference, Google 2002, pp. 1-10.

Mrazovac et al., "Smart Audio/Video Playback Control based on Presence Detection and User Localization in Home Environment", IEEE 2011, pp. 44-53.

\* cited by examiner

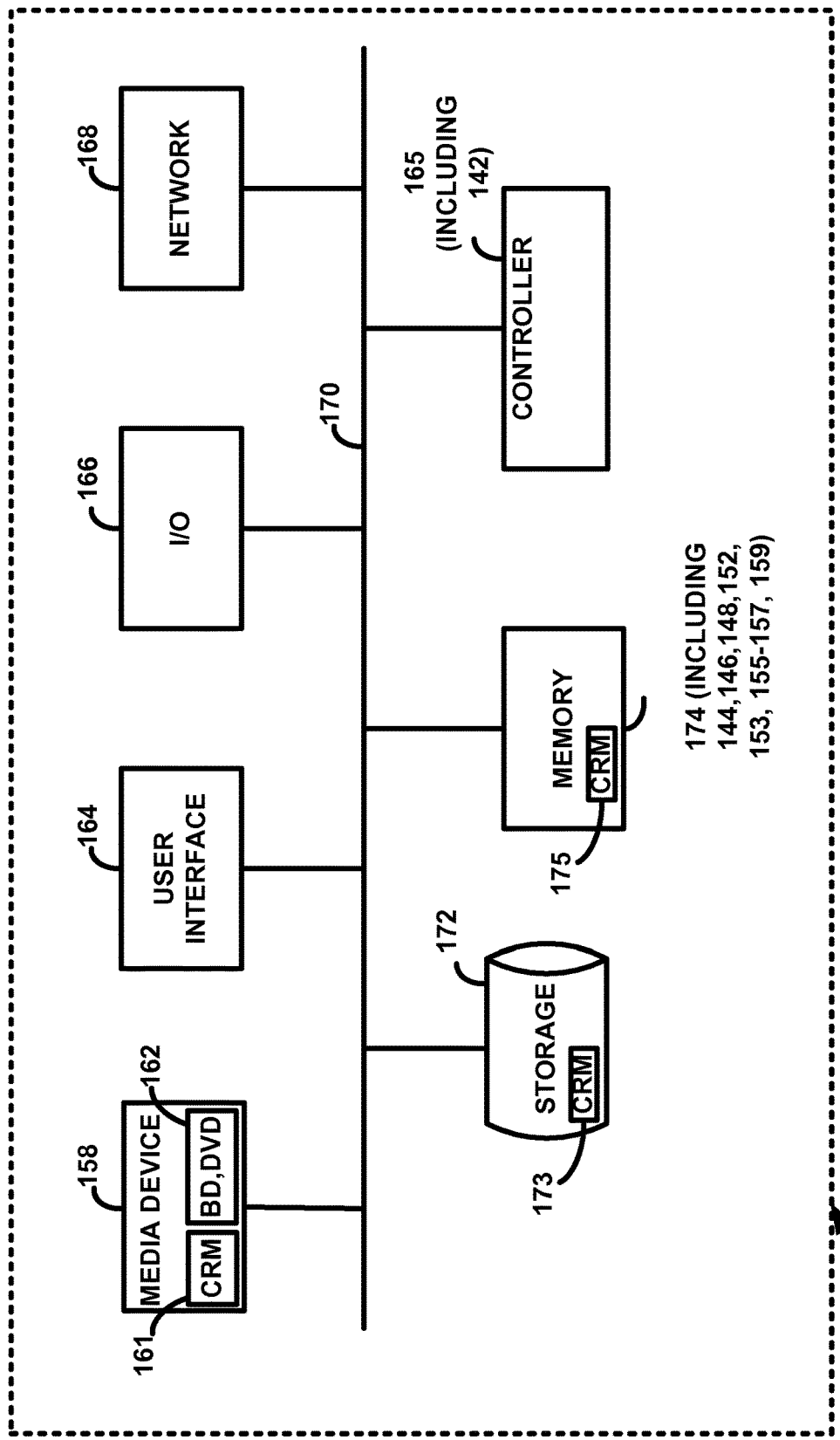

SYNCHRONIZATION OF FAVORITES AND/OR RECENTLY VIEWED LISTS BETWEEN REGISTERED CONTENT PLAYBACK DEVICES

STATEMENT OF RELATED APPLICATIONS

This application claims the benefit of U.S. Provisional Patent Application Ser. No. 61/442,039, filed Feb. 11, 2011, entitled "Method to Automatically Synchronize Favorites and/or Recently-Viewed Lists Between Registered Devices", which is incorporated in its entirety by reference herein.

BACKGROUND

Internet delivery of digital content to IPTVs continues to increase, as does the popularity of IPTVs themselves. As for many digital devices, especially those on networks, device registration of IPTVs can lead to many benefits for users. A key benefit for registration of IPTVs is association with a user account that allows access to various services, not only on the IPTV but on other content playback devices registered to the user. While employment of a user account has benefits, not all the content accessible to the user may be viewable on all of the user's registered content playback devices, either because of a lack of compatibility, availability and so on.

SUMMARY

Systems and methods are disclosed for creating and employing software to allow synchronization between favorites and recently viewed lists associated with second displays and content playback devices. The systems and methods further control a content playback device, and use principles and protocols of a "second display" to instruct a content playback device to play the media, e.g., on a device that is optimized for media playback, such as an IPTV or other large television screen and/or a home theater audio system or the like. The software may provide the user with a favorites list, a recently viewed list, or a browsing history of media that the user has previously viewed or otherwise accessed. The list may be of services or assets or both, and may pertain to items selected or viewed on a second display or on a content playback device.

In more detail, systems and methods are described that provide a way for favorites and recently viewed lists to be replicated across devices registered under a single user or group of users to allow the favorites to be accessed on multiple IPTV devices, allowing for an enhanced user experience.

In other words, when a second display browses content offerings of services on behalf of an IPTV device, a browsing history is created for this device. For an enhanced user experience, this browsing history may be replicated on all IPTV devices registered under the user. However, not all media available to the user may be capable of being utilized by all the consumer electronic devices that are available to the user. Accordingly, the browsing history presented by the browser may contain some media items that are not suitable for receipt by or presentation on all the available devices. Because of these differences between IPTV devices, a step may be taken of filtering out services and assets that are not available on a chosen IPTV device. For example, there are differences between services available to Blu-ray® players and DTVs. However, common services and assets may be available in these lists so that the user perceives no difference between the devices.

In one exemplary implementation, the following steps are performed: on the second display, when the user visits a service, or selects an asset, the service or asset ID is stored on the server and tied to the user and to the current device. When the user selects a different device, the service list for that device is displayed on the second display. The second display then requests a new favorites list and recently viewed list from the server for the new device. The server returns a favorites list and recently viewed list of services that is filtered based on the new device selected. The list on the server is a global list of all the services that have been visited by the user, e.g., limited by a date range or by a total number of services. This list is then filtered down based on the device. The server may also return a list of assets, which may be correspondingly filtered based on service and asset availability. The list on the server is a global list of all assets that have been played back by the user. This list may then be filtered down based on the device. The second display may then repopulate its current lists with the new information.

In this way, the favorites and recently viewed lists of services and assets are synchronized across devices registered under the user.

The synchronization may be performed for a number of reasons. For example, when a user changes from one second display to another, synchronization may be required because favorites and recently viewed and other lists have to be repopulated and certain services or assets may be no longer available, particularly if a different type of IPTV or content playback device has been selected.

In some implementations the software on the second display, or second display application, can be in the form of web application that works in association with a web browser, and which may even allow certain items to be played back on the second display. The use of the same allows significant benefits over prior systems. For example, the system and method may be employed with any device with a browser, and is not tied to any particular proprietary technology.

To accomplish the above, software is employed that is installed, in one implementation, on a second display to control and handle media playback. This software may have the ability to play the media in the browser, like traditional media handling software, in addition to the ability to control consumer electronics devices to enable the same to play the media. The software may specify the network location of selected media to content playback devices. The content playback devices, e.g., consumer electronics devices, may be caused to be the source of the request for a content item from a service provider, e.g., by providing the content item URL to the content playback device from the second display for a subsequent request to a service provider.

In the case that the software includes a plug-in within the browser to playback content items in the browser, the browser may provide the media data to the plug-in in a stream. The plug-in can buffer the media stream and direct the content item to the consumer electronics device that it instructed to play the media. The second display application may also prepare and update the browsing history that is presented to the user by the browser.

The second displays provide complementary functionality to the IPTV, but generally do not require additional investment by the user because the same make use of a device, e.g., a smartphone, laptop computer, tablet computer, a desktop, an internet appliance, etc., which most users would already have in their possession. Such a second display is a perfect complement to an IPTV because of the second display's strength in supported languages and character font sets, data entry, processing power, and user experience in content management. The application running on the second display may be a web application (scripting or non-scripting), a native application, a Java application, or any other sort of application that may work with a content playback device. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls.

Communications with service providers may take place through a proxy server, and the proxy server presents to service providers the authentication credentials of the content playback device, so that the second displays appear to the service providers as an authenticated content playback device.

The second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. If there is only one content playback device on the network, or if the user is browsing in a way that the content playback device identity is not needed, then this step may be omitted.

Once a content playback device has been chosen, a list of services may be displayed (if more than one is available). The list of services may be customized to those that have content playable on the chosen content playback device, or all available content may be displayed, in which case, in certain implementations, a notation may be displayed adjacent the content item as to whether it is playable on the selected device. Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen. In other cases, no content playback device need be chosen and the user may simply choose and queue content for later playback by a content playback device to-be-determined at a later time.

In addition to a list of available services, a list of favorites and/or recently viewed or accessed services may be displayed. If a content playback device has been selected, the list may be filtered so that it only displays those services suitable for receipt by the selected content playback device.

Assuming multiple services are available, the user then selects a service to browse. The service presents a list of available content items as noted above. The presentation may be in any number of forms, including by category, or in any other form of organization. The proxy server presents an authentication credential of the content playback device to the content server. In some cases, service provider credentials for accessing the various services may be stored in the account, and presented by the proxy server or management server to the content server when needed.

If the service selected by the user has been chosen from a filtered list of services available to the selected content playback device, only those content items associated with the selected service which are suitable for receipt by the selected content playback device may be displayed. For favorites, recently viewed lists, or a browsing history, the same may be filtered at the services level and at the content item level so that the user is only presented with those content items that can be utilized by the selected content playback device. The filtering may occur on the server side or at the second display.

Individual services may employ their own DRM schemes which the current system may then incorporate. For example, if a video content service provider only allows a certain predetermined number of devices on which their content may be played back, then this rule will be enforced or duplicated within the current system and method. Moreover, changes to such service provider parameters may be periodically polled for by the proxy server and/or management server, or the same may be polled for at the next login of the service. In other words, upon login, the system and method may poll for and receive a token associated with the given service provider, the token providing information to the system about the user account with the content service provider.

The system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider. In another aspect, a proxy server includes at least one processor and at least one network interface communicating with the processor to establish communication between the processor and a wide area network. At least one computer-readable storage medium is accessible to the processor and bears logic causing the processor to receive login information from a second display. Responsive to a determination that the login information is correct, the server sends to the second display a local IP address of the content playback device associated with the login information. The proxy server receives from the second display information about the content playback device requesting a list of services available to the content playback device from at least one content server of a service provider and sends a request for the list of services to a management server. The proxy server receives from the management server the list and sends it to the second display for presentation of information on a video display thereof. In addition, the proxy server may send to the second display a list of favorite services and/or recently accessed or viewed services associated with the user. The list may be filtered so that it only includes those services or assets which are available to the specified content playback device. In some cases the list may be obtained from the management server or the content server. The filtering of the list to tailor it for the specified content playback device may be performed by the management server, the content server, or the proxy server.

After the second display selects a service, the proxy server sends to the second display a list of content items provided by that service. The proxy server also sends to the second display a list of favorite content items and/or recently accessed or viewed content items associated with the user and provided by that service. The list may be filtered so that it only includes those content items which are available to the specified content playback device. In some cases the list may be obtained from the management server or the content server. The filtering of the list to tailor it for the specified content playback device may be performed by the management server, the content server, or the proxy server itself.

The proxy server receives from the second display a request for a content item and, responsive to the request of the content item, requests a service login of the content server. The proxy server receives back from the content server a list of items, assets, categories or services and sends the list to the second display. In this way, the list can be presented on a video display of the second display so that a user can navigate to enter a selection to command the content playback device to play the selection.

In one aspect, the invention is directed toward a method of viewing on a second display a list of favorite and/or recently-viewed services or content items playable on a selected content playback device The method may include the steps of: establishing a communication session between a second display and a source of content; associating the communication session with a user account of a user; receiving an identifier of a content playback device specified by the user on which content is to be played back; accessing a list of favorite and/or recently-viewed services or content items associated with the user account; filtering the list to include only those content items, or services offering such content items, available for playback on the specified content playback device; and delivering the filtered list to the second display.

Implementations of the invention may include one or more of the following. The filtered list may be presented in a web browser on the second display. The accessing, filtering and delivering the list may be performed in response to a user request. The identifier of the content playback device may be received from the second display. The identifier of the content playback device may be received from the specified content playback device. The list may be filtered by the second display application on the second display. The content playback device may be located on a common local network with the second display, and the causing may include transmitting the content item to the content playback device over the local network. The causing may also include transmitting the content item to the content playback device over a wired or wireless direct connection. The source of content may be a service provider.

In another implementation, the invention is directed toward a non-transitory computer-readable medium, including instructions for causing a computing device to implement the above method. In another aspect, the invention is directed toward a second display, the second display including: a display module, the display module providing a user interface and configured to display a content item or to receive a content item URL or display a list of favorites or recently viewed services or content items; a network communications module, the network communications module for coupling the second display to a local network or to a content playback device; a second display application module for receiving a selection of a specified content playback device and browsing services and content items and maintaining a list of favorite and/or recently viewed services and content items, wherein the second display application module is configured to filter the list to include only those content items, or services offering such content items, available for play back on the specified content playback device.

Implementations of the invention may include one or more of the following. The application module may be implemented in HTML, JavaScript, or a native code. The second display application module may be a web-browsing module and include a plug-in or helper application. The content item redirection module may be configured to buffer the content item and transmit the content item to the content playback device. The transmission may be via a wireless communication scheme. The content item redirection module may be configured to direct the content playback device to play back a content item associated with the content item URL by transmitting the content item URL to a server.

In another aspect, the invention is directed toward a server, including: a processor; a memory bearing computer readable instructions capable of receiving login information from a user of a second display and determining if the login information is correct for a user account associated with the user; memory bearing computer readable instructions capable of receiving an identity of a specified content playback device associated with the user account; memory bearing computer readable instructions capable of accessing or generating a list of favorite and/or recently viewed services or content items associated with the user account and further capable of filtering the list to include only those content items, or services offering such content items, available for playback on the specified content playback device; and memory bearing computer readable instructions capable of delivering the filtered list to the second display.

Implementations of the invention may include one or more of the following. The server may be a proxy server or a management server. The server may further include memory bearing computer readable instructions capable of accessing or generating the filtered list from a management server or a content server. The identity of the specified content playback device may include a network address of a content playback device previously registered to the user account.

Advantages of certain embodiments of the invention may include one or more of the following. Additional ways are provided to control TVs through a secondary display. Use of a second display affords significant additional features over the case of browsing solely on an IPTV, e.g., certain content items are easier to review and select on a second display than on a content playback device. In addition, by maintaining a list of favorites and/or recently viewed items (e.g., a browsing history) associated with the user's account or with the second display, the user is provided with a convenient method to quickly and easily access items of particular interest on different content playback devices. Depending on user preference, the list of favorites and/or recently viewed items may be provided to the user on the second display whenever the user accesses the content server or only when specifically requested by the user. Particularly in those cases where users access content from multiple content servers, which may or may not be operated by different service providers, it may be particularly convenient to receive a global list of favorites instead of requiring the user to request and receive a separate list from each of the content servers.

Other advantages will be apparent from the description that follows, including the figures and claims.

BRIEF DESCRIPTION OF THE DRAWINGS

Like reference numerals denote like elements throughout.

FIG. 7 illustrates an exemplary computing environment, e.g., that of the disclosed second display, proxy server, management server, or content server.

DETAILED DESCRIPTION

Figure 1:
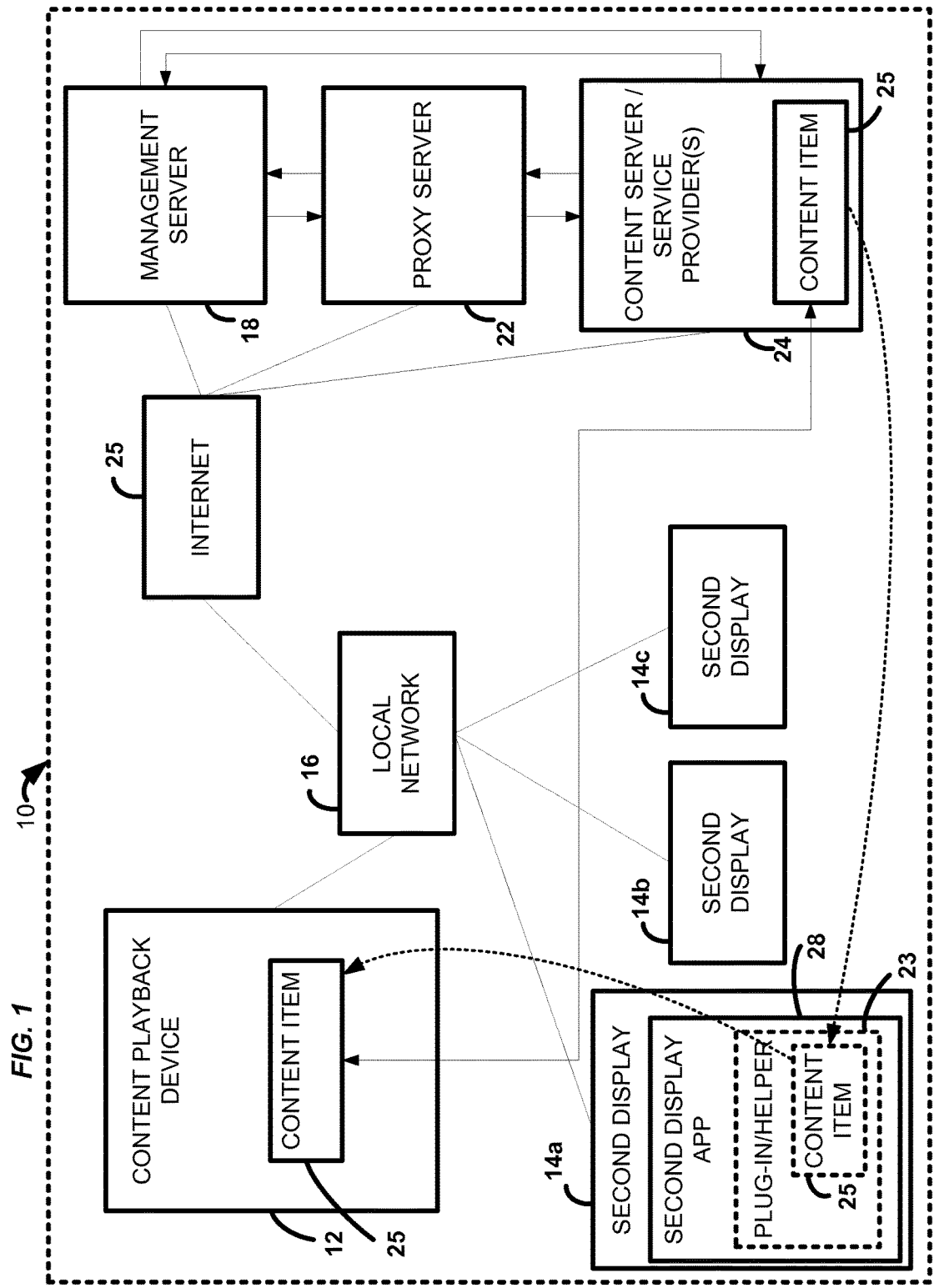
FIG. 1 is a block diagram of an exemplary system in accordance with one aspect of the present principles.

Referring initially to FIG. 1, a system 10 is shown including a content playback device 12 coupled to a local network 16, which may be wired, wireless, or a combination of both. Also coupled to the local network 16 are one or more second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24 corresponding to service providers.

A content item 25 may be stored on a content server 24 and the same may be selected, or in certain cases even in part viewed, by a second display 14a. In particular, the content item 25 may be browsed and selected using a second display application 28, which in some embodiments may be a web application. In some cases, particularly when a conventional web browser is employed, a plug-in or helper application 23 may run in the browser to facilitate viewing of the content item. The user of the second display 14a can then direct that the content item be displayed in the content playback device 12. In so doing, the user can, e.g., employ a user interface of the second display application to indicate this direction. A signal is then transmitted from the second display 14a to cause the content item or asset to playback on the content playback device.

The content playback device 12 may obtain the content item 25 for playback in a number of ways. Generally, the content playback device 12 receives the content item from the service provider (or an intermediary source). For this type of transmission, the second display 14a may send a signal to the service provider through the local network 16 and/or internet 25 to the service provider. In another case, where the second display application is a web application, the same may include JavaScript in HTML that directly passes the desired URL onto the content playback device. If necessary, the proxy server 22 may be employed, although in some cases content items 25 suitable for viewing in the second display application 28 may be obtained directly from the service provider. Many of these include DRM-free content or other freely-distributable content. In any case, other details about methods by which a second display may request that a content item appear on a content playback device are described below.

It is noted that, in some cases, the second display 14a may directly transmit the content item 25 to the content playback device 12. This direct transmission may be by way of a direct wired or wireless connection, such as via USB, Wi-Fi, or the like. For such direct transmissions, the second display 14a may act to buffer the media stream constituting the content item 25 in some implementations.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will generally be exemplified by an IPTV, in which case it will typically include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet 25, or between the second display 14i and the internet, may also take place through means besides the local network 16. For example, the second display 14i may communicate with the content playback device 12 through a separate mobile network.

The one or more second displays 14a-14c each bear a processor and components necessary to operate an application, e.g., a second display application and possibly a browser plug-in or helper application. Other types of applications may also be employed, so long as the same are capable of transmitting (and optionally playing) the selected media or otherwise specifying the network location of the same to a target device for subsequent playback. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories shown below to undertake present principles. Further, the second display 14i can receive user input signals from various input devices including a point-and-click device such as a mouse, a keypad, a touchscreen, a remote control, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the instantiation of an application. The implementation discussed here includes a web application, but it will be understood that other types of applications may also be employed. The second display 14i, executing the web application, prompts a user to input to each second display 14i login information. The login information may be common or may differ between second displays. The proxy server 22, responsive to reception of correct login information from the content playback device 12, returns the local network (e.g., IP) address of the content playback device 12 to the second display 14i, because the same has previously been registered to a user account in which such information is maintained. The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Responsive to a user selection of an item on the list, the second display 14i sends a request for a software asset corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14i, which is presented on the second display 14i so that the user can navigate to enter a selection. Responsive to the selection, the second display 14i sends a command to the content playback device 12 to access and play back the selection.

The content server or servers 24 may maintain a list of favorites and/or recently viewed items (e.g., a browsing history) associated with the user's account or with the second display 14i. These lists provide a convenient method by which the user can quickly and easily access items of particular interest on different content playback devices. The content server 24 may provide these lists to the user when the user requests a list of content items available from the content server 24. The list of favorites and/or recently viewed items may be provided to the user on the second display 14i whenever the user accesses the content server 24 or only when specifically requested by the user. In some implementations the list of favorites and/or recently viewed items may be maintained by the proxy server 22 instead of the content server 24.

Particularly in those cases where users access content from multiple content servers, which may or may not be operated by different service providers, it may not be practical or desirable for the user to request and receive a separate list from each of the content servers. In these cases each content server may send its list to the management server or proxy server. The management or proxy server can then combine the individual lists to create and maintain a global list that can be made available to the second display. Alternatively, the list may be created or added to at the management server or proxy server at the time of assets selection.

Regardless of the particular server which maintains the list of favorites and/or recently viewed items, when the user accesses a service or selects a content item or other asset, a record is created in which the asset identifier (ID) is associated with the user and stored on the appropriate server. The record may also associate the asset ID and user ID with the second display or content playback device from which the user request was received.

When a user receives a favorites and/or recently viewed list, that list may include all such assets associated with the user, regardless of which device previously received the assets on the list. For instance, some of the assets may have been presented on content playback device 12 while other of the assets on the list may have been presented on another content playback device or on one of the second displays 14a-14c. However, not all assets may be suitable for receipt by or presentation on all the available devices. This may be particularly important where a selected device has a completely different set of capabilities as a previously selected device. For instance, assets that may be suitable for presentation on an IPTV may not be suitable for presentation on a DTV, a digital audio system, or a Blu-ray® player.

As one particular example, a first selected device may be an IPTV, and a second selected device may be an audio receiver. Synchronization is necessary because the audio receiver cannot playback video content. The ability to choose video content while the audio receiver is selected may lead to consumer confusion. Of course, in certain implementations, in the above scenario, a user may be given the option to playback merely the audio portion of a multimedia content item on an audio system. In another example, a first selected device may be an IPTV, and a second selected device may be a smart phone. In this case, multimedia content may be presented on the smart phone, but at a significantly different resolution than on a typical IPTV. In the same way, certain services or content items may not be available in certain regions for contractual or government reasons. Such services or content items may then be disabled or filtered out from displaying on a second display when the second display has selected a device in that region for playback. By filtering out these unavailable services and/or content items, consumer confusion can be greatly reduced because the consumer is no longer offered a choice of a service or content item that is unavailable.

Once the user designates to the proxy server 22 a particular content playback device 12 that is to receive an asset, the proxy server 22 will filter the favorites and/or recently viewed list before providing it to the user on the second display 14i. The filtering will be performed so that only those favorite or recently viewed assets suitable for receipt by the designated content playback device 12 will be included in the list(s). The proxy server 22 can perform this filtering process using the information about the designated device which was previously received from either the second display 14a or the designated content playback 12 device itself. Accordingly, when the user receives the favorites and/or recently viewed list from the proxy server 22, either automatically or upon user request, the list will only show those assets that are available for the selected content playback device. In this way, the favorites and/or recently viewed list of content items, assets, categories, or services is synchronized across all content playback devices registered to that user. It is noted that while the proxy server 22 has been described as performing this function, in many cases the management server 18 may also perform it.

In those implementations in which the favorites and/or recently viewed list is provided to the user by the content server 24, the filtering process may be performed by the content server 24 (after receiving the necessary information from the proxy server 22) or the proxy server 22 (or management server) may perform the filtering process itself after receiving the list from the content server 24.

In another implementation, the filtering can also be performed by the second display application. In this case, the list that is returned to the second display will be a global list of all available assets. The filtering is performed based on the IPTV device that is currently selected by the second display application. This method, however, may require extra processing on the part of the second display device, increasing the risk of errors as well as the return of unnecessary payload by the server.

The command from the second display 14i to play the local content item may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the Internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
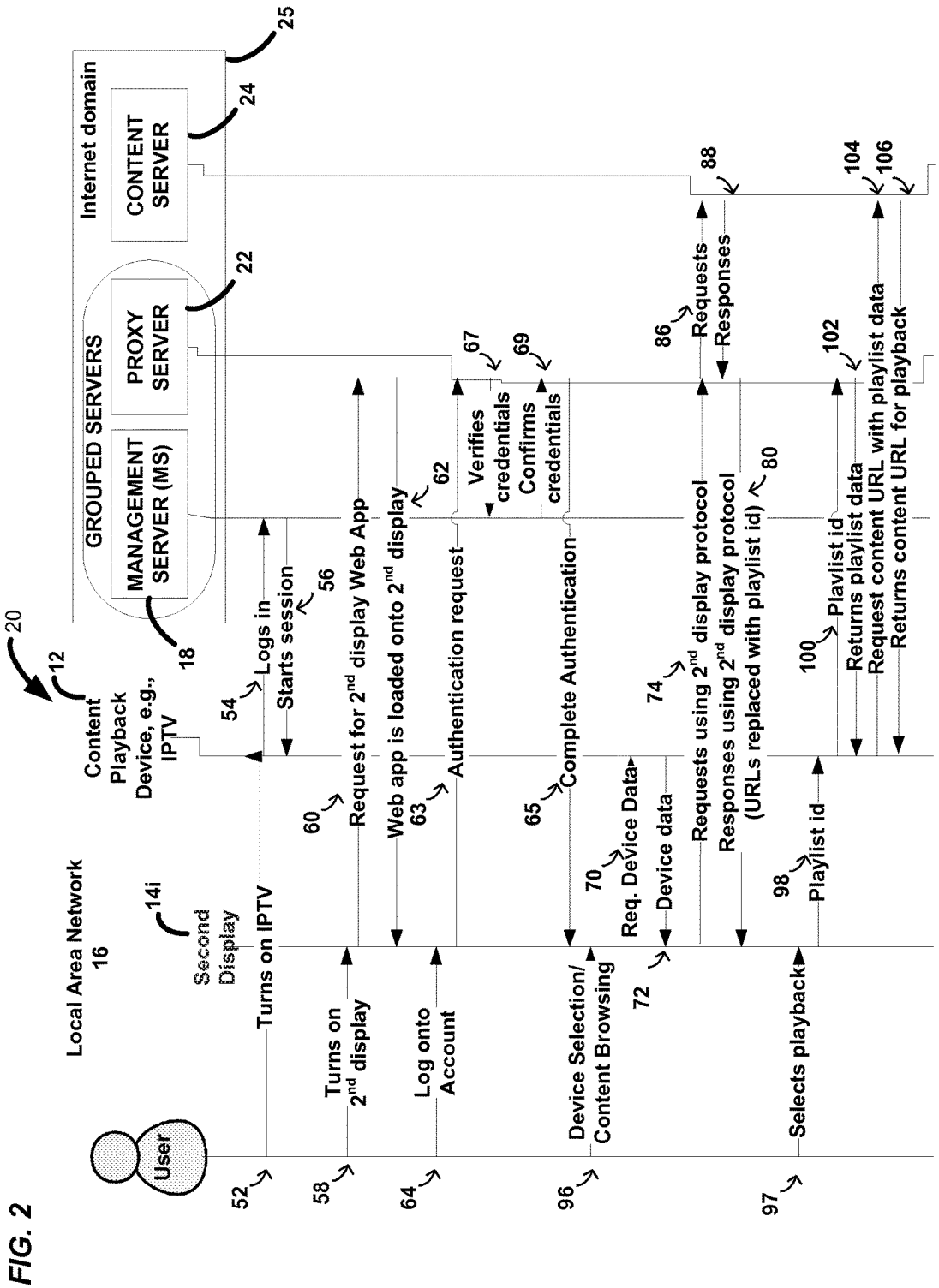
FIG. 2 is a sequence diagram illustrating a system and method according to another aspect of the present principles.

FIG. 2 is a sequence diagram illustrating an exemplary implementation of the system and method for enabling a user to employ a second display to browse content playback devices, service providers, and content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and, e.g., instantiates a session such as a web browser session in which control may be exercised over the content playback device. A utility is executed on the second display 14i, at state 60, which sends a request to the proxy server 22, which returns in state 62 an application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14*i* in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14*i*, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The second display 14*i*, using the local IP address returned as noted above, accesses the content playback device directly, in the sense of communicating through the local network. To select a particular content playback device, the second display 14*i* requests information about the content playback device 12 at state 70, including language information, digital rights management (DRM) information, etc., as desired, which information is returned from the content playback device to the second display 14*i* at state 72. Since the second display 14*i* knows the IP address of the content playback device 12 and consequently communicates directly with the content playback device 12, the second display 14*i* communicates using a local web address of the content playback device 12 that need not be globally addressable, and may so communicate as long as the second display 14*i* and content playback device 12 are on the same local network.

Each second display 14*i* may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., the second display. In addition to the services, a favorites and/or recently viewed list may be provided to the second display. As previously discussed, this list may be filtered so that it only includes those services that are available to the content playback device 12 that was selected in state 96. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80. If the filtered favorites and/or recently viewed list is provided by the content server 24 to the proxy server 22, this request from the proxy server 22 to the content server 24 may also include a request for such a filtered list.

The content available for selection is presented on the second display so that the user can navigate in state 97 the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may interrupt the current content. Alternatively, the new content may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to the "recently viewed" list and selecting the last video played after switching control to the desired device. As noted above, the recently viewed list may be filtered to only include those recently viewed items available to the content playback device which has now been given control.

The above description has been for the case where the proxy server 22 is employed to hide the content source, e.g., a content URL, from the second display 14*i*. That is, the proxy server 22 provides an API for the second display to use so that the content and/or content URL cannot be accessed directly, i.e., the details of the management server transactions to access the services remain desirably unknown. In many cases, the second display 14*i* may have stored thereon little or nothing of the content playback device 12 details. In some cases, however, the URL may be directly provided from the proxy server 22 or the proxy server 22 may even be bypassed, e.g., in cases where the content item is intended for free distribution, e.g., movie trailers or the like. If the URLs are made available to the second display 14*i*, the list of favorites and/or recently viewed content items or other asserts available to the user may be presented to the user through the second display application. If the second display application is, or includes, a web browser, the list may be presented in the native bookmarking feature often available in such web browsers. Filtering of the list so that it is tailored to a particular content playback device may then be performed by the second display application 28 or in part by employing a browser plug-in or helper application.

Similarly, while the above description has focused on content item playback on content playback device 12, certain content items, e.g., those which are intended for free distribution, may be played back on the second display 14i itself, if the same has been appropriately configured, e.g., via using the second display application and/or the plug-in or helper application described.

In the case where multiple second displays request content to be played at or near the same time, a simple rule such as the first-in-time may prevail. Alternatively, a priority scheme may be configured, such that certain second displays take precedence over other second displays.

Note further that the control device may command the content playback device to play content by sending to the content playback device over the local network commands coded as if they were sent from an infrared remote control, specifically for example the commands may be in the Sony Infrared Remote Control System (SI'RCS) protocol.

Figure 3:
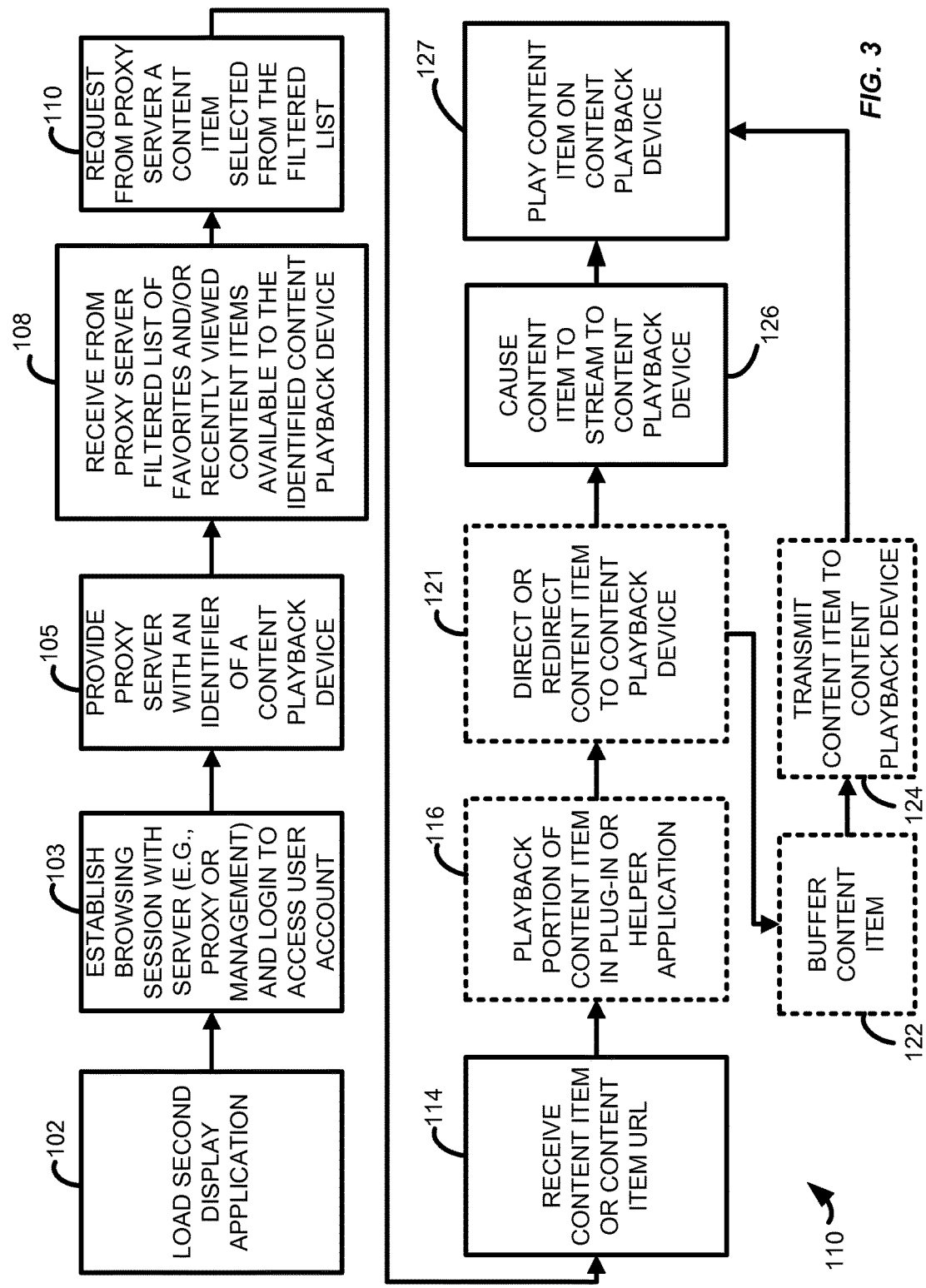
FIG. 3 is a flowchart illustrating an exemplary method according to yet another aspect of the present principles.

FIG. 3 illustrates one exemplary method 110 by which software may be employed to handle playback of media, especially video, by the second display application that, in addition to or instead of playing the media in the second display application, will use the second display protocol to instruct a separate display device, such as a content playback device, to play the media. For purposes of illustration only the second display application will be referred to as a web application, which in this example also employs a plug-in or other helper application.

One context of the system and method may be that a user loads the second display application (e.g., a web application) (step 102) and requests a content item to be played back, although variations will be seen by one of ordinary skill in the art given this teaching. A first step is that a plug-in or other helper application may be loaded into the browser in the case where a portion of the content item is to be played back on the second display. A next step is that a browsing session is established with a proxy server and a user logs in to access his or her user account (step 103). After logging in or otherwise being authorized to access the user account, the proxy server is provided with an identifier of the content playback device on which a content item is to be played back (step 105). In some cases the proxy server may present a list of authorized content playback devices to the user from which the user can select. It is noted in this regard that a second display may independently discover content playback devices that are not associated with the user account at the time of discovery. In such cases, the management server or proxy server may prompt the user to register such devices with the user account. Registration may be required for playback of certain types of content items or assets.

In response to the selection of a particular content playback device, the browser receives from the proxy server a filtered list of favorites and/or recently viewed content items (step 108). The filtered list only includes those content items that are suitable or otherwise available for presentation on the particular content playback device that is selected. Other content items that may be included in the list prior to filtering, which may have previously been delivered to content playback devices other than the one that is currently selected, are excluded from the filtered list. The user then selects a content item from the filtered list and requests the selected content item from the proxy server (step 110).

Optional next steps may include that a portion of the selected content item, or the content item URL or other such identifier is received at the plug-in or helper application (step 114). A portion of the content item may be played back using the second display application itself or the plug-in or the helper application (step 116). The content item may then be directed or redirected to the content playback device (step 121).

Step 121 may occur in a number of ways. Where the content item is caused to be directly transmitted to the content playback device, an optional step may be performed of buffering the content item (step 122) at the second display. The content item is then transmitted to the content playback device (step 124) using the techniques described above. Where the second display causes the content item to be played back on the content playback device without transmitting the same itself, the content item is caused to be streamed (or, alternatively, downloaded) to the content playback device (step 126), such as by providing the content item URL to the content playback device for subsequent retransmission in a request to the service provider for the content item, or the second display may provide details about the content playback device to the service provider to initiate the transmission at the service provider's end. In this event, permission may be obtained from the user prior to playback at the content playback device. In any case, a final step is to play the content item on the content playback device (step 127).

Figure 4:
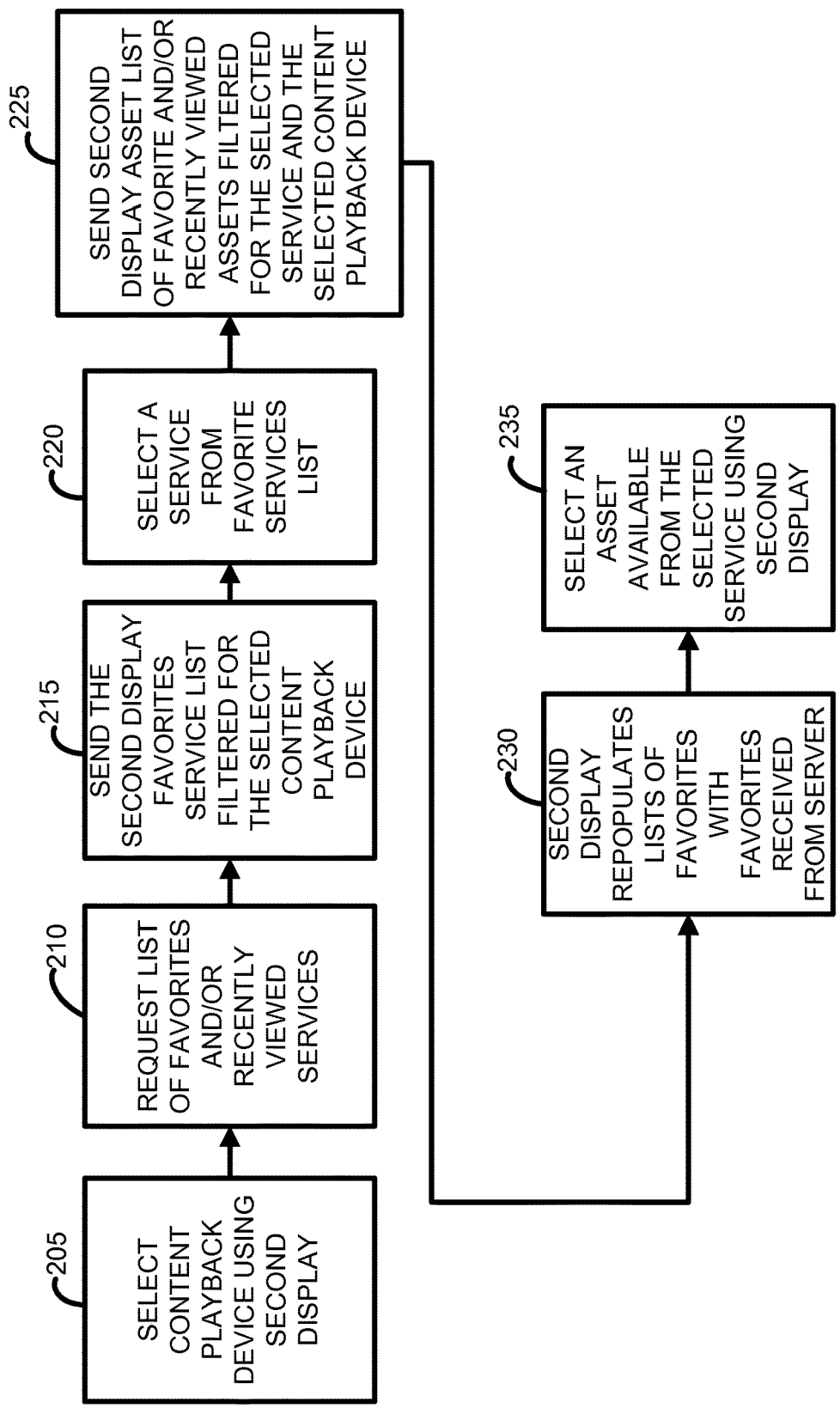
FIG. 4 is a flowchart illustrating another exemplary method according to a further aspect of the present principles.

FIG. 4 illustrates an exemplary method by which the user selects a service from among a list of favorite services. A list of favorite services may include, for example, services such as Crackle™ or Qriocity®, for instance. Not all content playback devices can display or otherwise present all of these services. For example, a digital audio system could appropriately render offerings from a music service but not from a video service. Accordingly, it would be useful to tailor the favorites list for different playback devices.

The example in FIG. 4 assumes that the user has already established a communication session with the proxy server and has logged-in or otherwise identified itself to the proxy server. In addition, the example assumes that the user has previously visited one or more services using the second display and that these services have already been affiliated with the user's account.

First, the user selects a content playback device on which a service is to be received (step 205). The second display may also request a new list of favorite and recently viewed services from the server for the selected playback device (step 210). The server returns a favorites list and recently viewed list of services that is filtered based on the content playback device that has been selected (step 215). That is, the server maintains a global list of all the services that have been visited by the user, e.g., limited by a date range or by a total number of services. The server then filters this list based on the selected playback device. In some cases the favorites list may be sent automatically without being specifically requested by the user.

The user then uses the second display to select one of the services from the favorites list (step 220). In response, the server returns a list of favorites and/or recently played back assets associated with that service, which may be filtered to only include those assets that are available to the selected content playback device (step 225). That is, the proxy server maintains a global list of all the assets that have been previously played back by the user for the selected service. The proxy server then filters this list based on the selected playback device. The second display can repopulate its own lists with the new information obtained from the proxy server (step 230). Finally, the user requests an asset, either by making a selection from the favorites list or by browsing and selecting from one or more lists of other assets available from that service (step 235).

Aspects of various components are described below.

Figure 5:
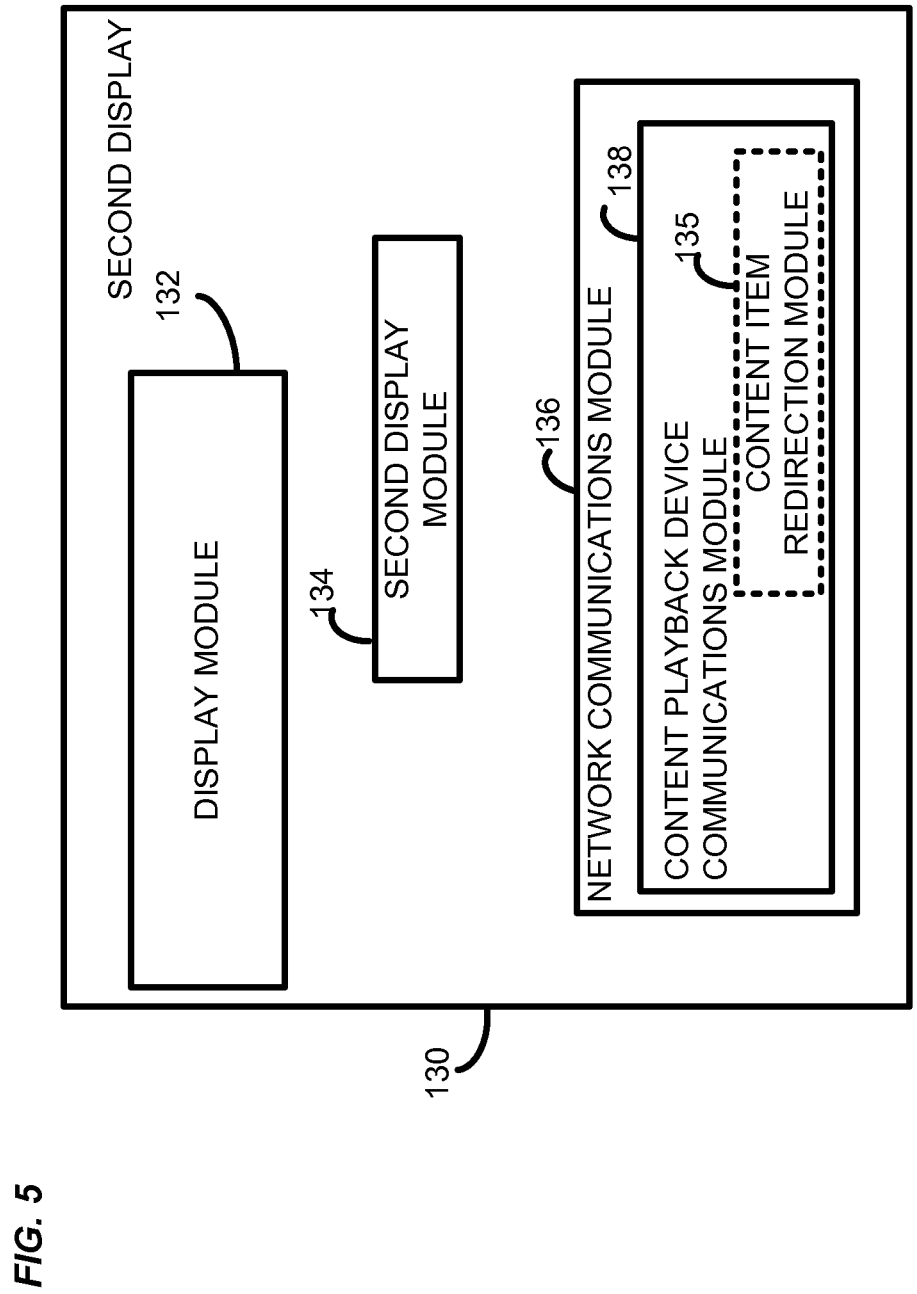
FIG. 5 is a block diagram of an exemplary second display system in accordance with another aspect of the present principles.

FIG. 5 illustrates one implementation of a second display 130. The second display 130 includes a display module 132 for use in, among other aspects, viewing lists and selecting items related to the content playback device. For example, a list of content playback devices accessible to the local network and/or addressable by the second display may be displayed using the display module 132, and the user may choose a content playback device from among them. In addition to choosing a content playback device, or instead of, a user may review a list of accessible service providers using the display module 132. For example, such service providers may include those offering video-on-demand services for movies and other video content, or any number of other sites on which media and content may be browsed and selected. In one implementation, where a content playback device has been chosen, the results may be filtered based on the capability of the device to render the content. In another implementation, the display module 132 may display not just content accessible to the local network, but also content resident on the local network, such as content stored on a digital video recorder or Blu-ray® player. It is noted that the actual display may be external to the second display device itself. In the case of a Blu-ray® player being used as a second display device, the display module 132 may be the unit that produces the HDMI output signal, while the actual display may be performed by the IPTV that is connected to that HDMI output.

Also within the second display 130 may be a second display application 134 through which the above noted content items may be browsed in the case where the second display application is written in HTML and JavaScript. The second display application 134, which in some implementations may be a web-browsing module, may be implemented in a number of ways, including by executing application code written in HTML, JavaScript, or the like. A second display application implemented in such a way allows the same to be implemented across many platforms, allowing any number of types of second displays to be employed. In some cases, however, special applications, e.g., helper applications, may be employed to communicate with particular proprietary or non-web-based technologies. As noted above, he second display application 134 may also include various plug-in modules to enable different content types to be played back in the browser itself. Such plug-ins then allow content items to be viewed prior to their direction or redirection to the content playback device.

The second display 130 also includes a module for network communications 136. The network communications module 136 allows the second display to communicate with the local network as well as, in some cases, specific devices directly. As part of the network communications module 136, a communications module 138 for communications with a content playback device is provided. The content playback device communications module 138 allows the second display to communicate with the content playback device either over the local network or directly (internet communications may also be employed). Such direct communications may include various types of wired or wireless transmission schemes, including Wi-Fi, USB, infrared, Bluetooth®, or the like.

In some implementations, the content playback device communications module 138 may further include a content item redirection module 135. The content item redirection module 135 takes a signal from a user interface associated with the second display application module 134 and/or from the plug-in or helper application within. Upon receipt of a signal that a content item is desired to be played back on the content playback device 12, the content item redirection module 135 employs its coupling with the content playback device, via the content playback device communications module 138, to directly transmit, and if necessary buffer, the content item to the content playback device. As noted above, in another implementation, the content item redirection module 135 may employ network communications, using the network communications module 136, to request that the content item be sent to the content playback device without using the second display as an intermediary. This request may be configured to be from the content playback device itself or initiated by the service provider.

It is noted that the above modules may be implemented in hardware, non-transitory software, or a combination of the above. Typically, the same will be implemented within the context of a laptop computer, a tablet computer, a smart phone, or the like.

Figure 6:
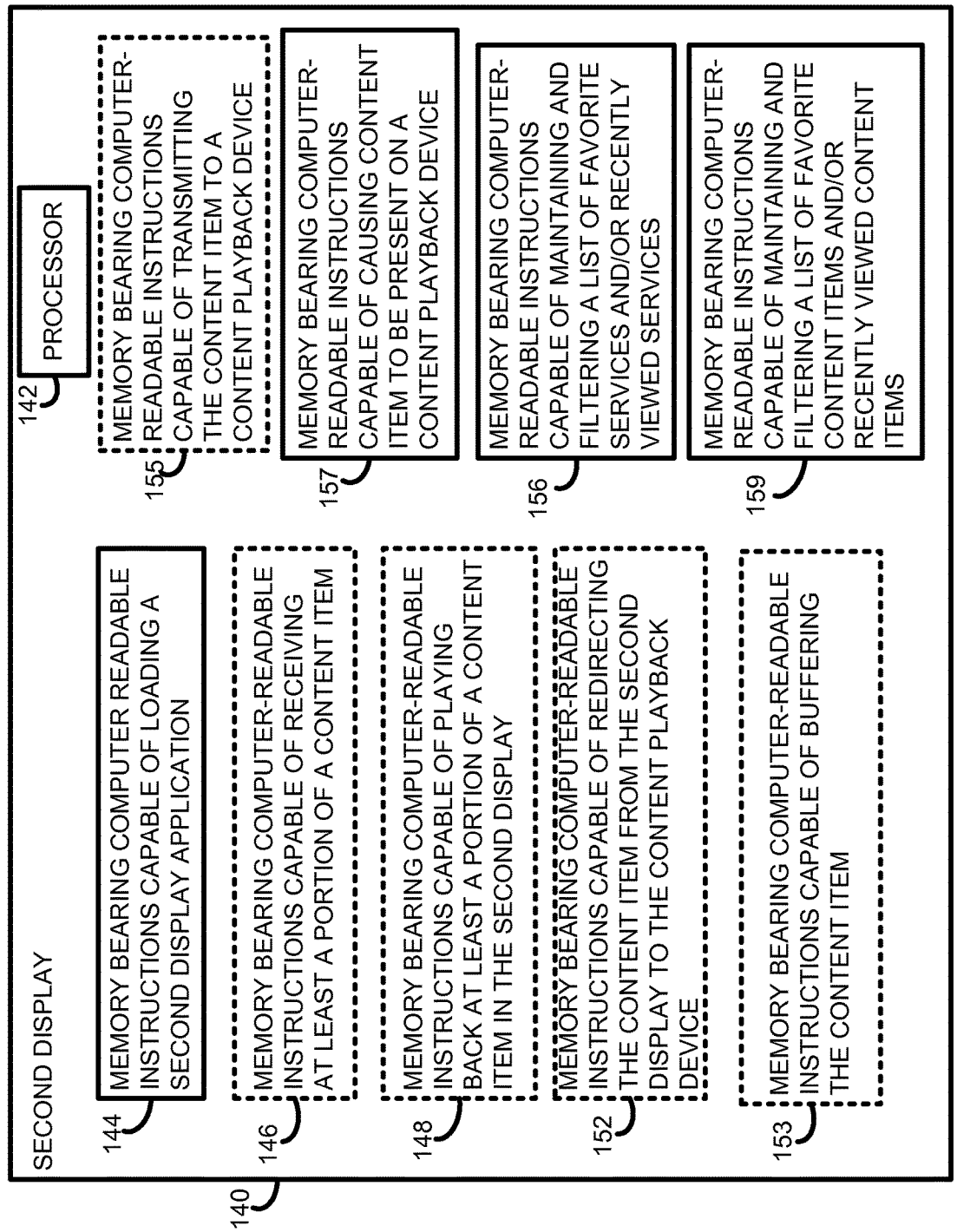
FIG. 6 is a block diagram of another exemplary second display system in accordance with another aspect of the present principles.

Referring to FIG. 6, another implementation of a second display 140 is illustrated. In this implementation, the second display 140 includes a processor 142, and memory 144 bearing computer readable instructions capable of loading a second display application.

The second display 140 further includes a number of optional memories, for example, the second display 140 may include memory 146 bearing computer readable instructions capable of receiving information about, or a portion of, a content item. The second display 140 may further include memory 148 bearing computer readable instructions capable of playing back at least a portion of a content item in the second display, and memory 152 bearing computer readable instructions capable of redirecting the content item from the second display to the content playback device. It is noted in this context that the term redirection does not necessarily mean causing playback to stop on a second display and to restart on a content playback device, although that may be one implementation. The term is generally employed to refer to the playback or at least targeting of a content item on a second display and then causing the content item to stream and/or play back on the content playback device. The second display 140 may further include optional memory 153 bearing computer readable instructions capable of buffering the content item. The memory 153 is optional, but may be particularly useful when content item data is being directly transmitted from the second display to the content playback device. The second display 140 further includes memory 155 bearing computer readable instructions capable of transmitting the content item to a content playback device. This memory 155 may be used in conjunction with the memory 153 where the content item is directly transmitted.

The second display 140 may include memory 157 bearing computer readable instructions capable of causing a content item to be present on a content playback device. With memory 157, the content item may be made present by downloading from a service provider, either directly or through a management or proxy server. In this regard, the request for the content item may be configured to be made from the content playback device or from the second display.

The second display 140 may also include memory 156 bearing computer readable instructions capable of maintaining a list of favorite services and/or recently viewed services. The memory 156 bearing computer readable instructions may also be capable of filtering the list of favorite services and/or recently viewed services to include only those services available to a particular content playback device specified by the user. In this regard, the memory 156 may access data stored in the second display about the selected content playback device. As noted, a content playback device may be selected by a user choice, by accessing a default content playback device, by accessing a profile that specifies a content playback device, or the like.

The second display 140 may also include memory 159 bearing computer readable instructions capable of maintaining a list of favorite content items or other assets and/or recently viewed content or other assets. In some cases, these assets may be associated with a service that has already been selected from the list maintained by memory 156 bearing computer readable instructions. Alternatively, the assets list may be a global list of assets that are favorites or have been recently played, without regard to the services from which they were drawn. The memory 159 bearing computer readable instructions may also be capable of filtering the list of favorite assets and/or recently viewed assets to include only those content items available for playback on a particular content playback device specified by the user. In this regard, the memory 159 may access data stored in the second display about the selected content playback device.

Systems and methods have been disclosed that allow improvement of the user experience of the IPTV without adding to the hardware costs of the unit. The systems and methods allow for automatic synchronization of favorites and/or recently viewed lists between registered devices.

One implementation includes one or more programmable processors and corresponding computing system components to store and execute computer instructions, such as to execute the code that provides the second display or various server functionality, as well as for browsing. The second display 14i functionality will be focused on here, but it will be understood that the various server functionality, e.g., that of the proxy server 22, management server 18, and content server 24, may also be accomplished with such components. Referring to FIG. 7, a representation of an exemplary computing environment for a second display or server is illustrated.

The second display or server includes a controller 165, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 165 includes a programmable processor and controls the operation of the second display 14i and its components. The controller 165 loads instructions from the memory 174 or an embedded controller memory (not shown) and executes these instructions to control the system. In its execution, the controller 165 may provide the second display 14i control of a content playback device system 12 as, in part, a software system. Alternatively, this service can be implemented as separate modular components in the controller 165 or the second display 14i.

Memory 174, which may include non-transitory computer-readable memory 175, stores data temporarily for use by the other components of the second display 14i, and the same may include memories 144, 146, 148, 152, 153, 155, 156, 157, and 159 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display 14i, such as for storing data used by the system. In one implementation, storage 172 is a hard disc drive or a solid state drive.

The media device 158, which may include non-transitory computer-readable memory 161, receives removable media and reads and/or writes data to the inserted media. In one implementation, the media device 158 is an optical disc drive or disc burner, e.g., a writable Blu-ray® disc drive 162.

The user interface 164 includes components for accepting user input, e.g., the user content selections, from the user of the second display 14i and presenting information to the user. In one implementation, the user interface 164 includes a keyboard, a mouse, audio speakers, and a display. The controller 165 uses input from the user to adjust the operation of the second display 14i.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The second display 14i may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, while in some implementations the second display application running on the second display has been disclosed as a web application, and potentially including a plug-in or helper application, the same may be a native application, a Java application, or any other sort of application that may work with a content playback device.

Moreover, while several implementations of the invention include that the user select a particular content playback device for playback, in some implementations a user may browse content with no content playback device selected at all. In other implementations, a cache or cookie or other information may be employed to store information about content playback devices, so that no user choice is necessary. In another example, samples of content items may be obtained from content service providers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. It is also noted that certain types of browsing may require no device at all, e.g., browsing shopping sites. Still, some level of customization may occur, e.g., by consideration of the origination location of the visiting second display's IP address.

Content items from any suitable source are contemplated, including but not limited to: networked, wireless, including 3G, 4G, and the like, local, e.g., from a local or shared drive or accessible via DLNA or accessible via a specialized network storage device, or accessible via removable media such as a media card or USB storage device, CD, DVD, or Blu-ray®. Content may also be accessed from a cell phone, portable media player, camera or camcorder, or other devices the second display may access. In addition, any suitable types of content items are contemplated, including but not limited to AC3, MP3, MPEG, etc. Any suitable format of content items is contemplated, including but not limited to m3u, ASX, ASX-XML, etc. Any suitable protection scheme is contemplated, including but not limited to DRM, etc. Any suitable protocol is contemplated, including but not limited to HTTP, HTTPS, etc. Any suitable playback method is contemplated, including but not limited to those varying in buffering limit, when to buffer, treating video playback differently from audio playback, and the like.

In addition, the above description was primarily directed to an implementation in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the web application for the second display. In many cases, broadcasting methods are primarily directed to native applications, not web applications; however, a broadcasting library may be employed to allow the implementation within a web application. It is additionally noted that broadcasting methods may be employed in the discovery of content playback devices by second displays, such as via Bluetooth®, infrared, or the like.

While the above description has focused on implementations where a second display is coupled to a content playback device through a local network, it will be understood that the same will apply to any method by which the two may communicate, including 3G, 4G, and other such schemes.

Accordingly, the present invention is not limited to only those implementations described above.

The invention claimed is:

1. A method of viewing on a second display a list of favorite and/or recently-viewed elements, the elements corresponding to service providers accessible by a selected content playback device, comprising:
   i. establishing a communication session between a second display and a source of content, the communication session associated with a user account of a user;
   ii. receiving on the second display an identifier of a content playback device specified by the user on which content is to be played back, the second display configured to control playback of content items on the content playback device;
   iii. accessing from the second display a list of favorite or recently-viewed elements, the elements corresponding to service providers available to the user account, the user account associated with a plurality of content playback devices;
   iv. wherein the accessing includes filtering the list on the second display, the filtered list including only those service providers offering content items available for playback on the specified content playback device, wherein the filtering includes removing service providers offering only content items that are not available because they are not playable on the specified content playback device, and wherein the filtering also includes removing service providers offering content items that are not available because the content items from the service provider are not available to the content playback device specified by the user because the user account is not affiliated with the service provider;
   v. receiving on the second display a selection of a service provider from the filtered list; and
   vi. transmitting an indication of the selection from the second display to the service provider.

2. The method of claim 1, further comprising:
   instantiating a second display application on the second display;
   playing back at least a portion of a specified content item from the service provider selected from the filtered list in the second display application; and
   receiving user input in the second display application, the user input causing the specified content item to play back in the specified content playback device.

3. The method of claim 1, wherein the filtered list is presented in a web browser on the second display.

4. The method of claim 1, wherein accessing, filtering and delivering the list is performed in response to a user request.

5. The method of claim 2, wherein the content playback device is located on a common local network with the second display, and wherein the causing includes transmitting the content item to the content playback device over the local network.

6. The method of claim 2, wherein the causing includes transmitting the content item to the content playback device over a wired or wireless direct connection.

7. The method of claim 1, wherein the source of content is a service provider.

8. The method of claim 1, further comprising:
   transmitting to the second display a filtered list of favorite service providers and/or recently viewed service providers that are accessible to the specified content playback device;
   receiving from the second display a selection of a first content item from one of the service providers;
   placing the first content item in a queue;
   receiving from the second display a selection of a second content item from another of the service providers; and
   placing the second content item in a queue.

9. A non-transitory computer-readable medium, comprising instructions for causing a computing device to implement the method of claim 1.

10. The method of claim 1, wherein the source of content is a management server or a proxy server.

* * * * *